(12) United States Patent
Gjerstad et al.

(10) Patent No.: US 6,962,655 B1
(45) Date of Patent: Nov. 8, 2005

(54) FILTER ACCESSORY FOR USE IN SWIMMING POOL WATER FLOW SYSTEM

(76) Inventors: Bruce D. Gjerstad, 5302 E. Van Buren St., Apt. 3012, Phoenix, AZ (US) 85008; David L. Gillespie, 962 Ridge Crest Dr., Gahanna, OH (US) 43230

( * ) Notice: Subject to any disclaimer, the term of this patent is extended or adjusted under 35 U.S.C. 154(b) by 0 days.

(21) Appl. No.: 10/860,245

(22) Filed: Jun. 4, 2004

(51) Int. Cl.$^7$ .......................... B01D 29/55; E04H 4/16
(52) U.S. Cl. ................... 210/169; 210/416.2; 210/448
(58) Field of Search .......................... 210/169, 416.1, 210/416.2, 448, 452

(56) References Cited

U.S. PATENT DOCUMENTS

| | | | |
|---|---|---|---|
| 2,337,203 A | * | 12/1943 | Marple .................. 210/238 |
| 3,642,138 A | * | 2/1972 | Sheda .................. 210/170 |
| 3,909,415 A | * | 9/1975 | Young .................. 210/234 |
| 4,393,526 A | | 7/1983 | Miller et al. |
| 4,960,514 A | | 10/1990 | Paskert |
| 5,059,314 A | | 10/1991 | Beckman |
| 5,279,728 A | | 1/1994 | Weiss |
| 5,336,400 A | | 8/1994 | Patrice |
| 5,350,508 A | | 9/1994 | Van der Watt |
| 5,938,804 A | | 8/1999 | Engel et al. |
| 6,106,706 A | * | 8/2000 | Roy et al. .................. 210/99 |
| 6,572,765 B2 | * | 6/2003 | Lincke .................. 210/169 |

* cited by examiner

*Primary Examiner*—Fred G. Prince
(74) *Attorney, Agent, or Firm*—Donald R. Schoonover

(57) ABSTRACT

A basket that is used in a pool cleaning system includes a flap that is biased closed and is opened against the bias by water flowing into the basket. When a pump drawing water out of a pool moves water through the basket, debris in the water is trapped in the basket. However, when the pump is shut off, any back flow of water associated with the pump shut off will not cause debris to move out of the basket because the flap will be shut by the bias and the backward movement of water.

4 Claims, 3 Drawing Sheets

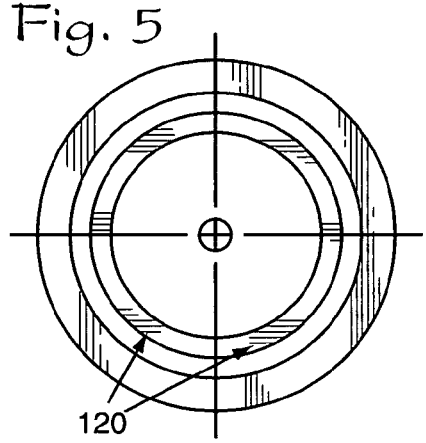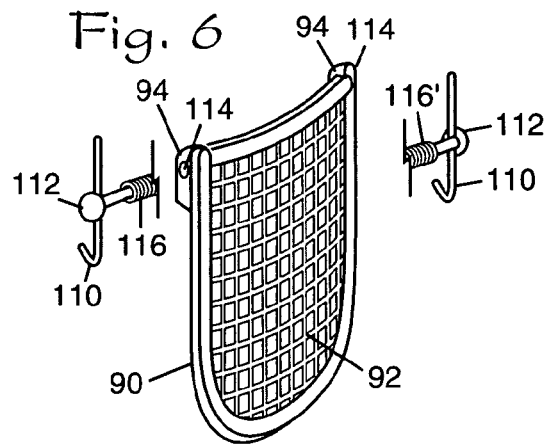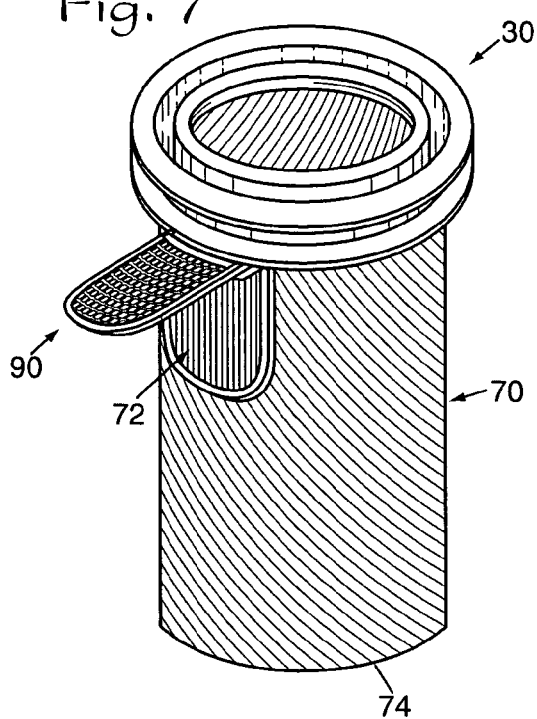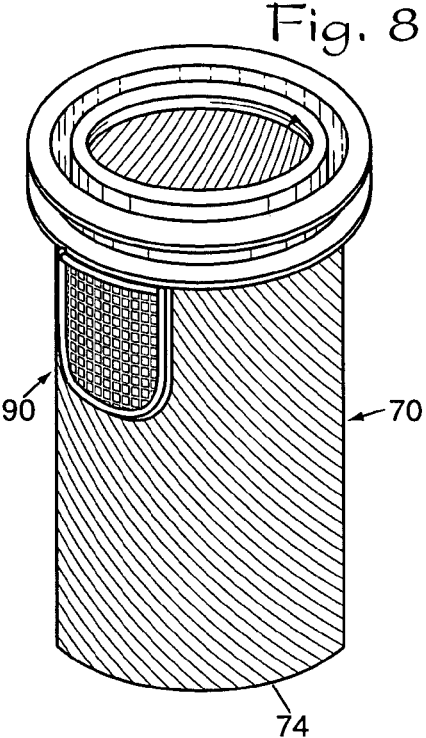

FILTER ACCESSORY FOR USE IN SWIMMING POOL WATER FLOW SYSTEM

BACKGROUND OF THE INVENTION

1. Field of the Invention

The present invention relates to the general art of filters, and to the particular field of filter accessories.

2. Discussion of the Related Art

Every swimming pool must be cleaned. This is often accomplished with a pool vacuum. Skimmers are also used to keep a pool clear of debris.

Swimming pools are often cleaned by connecting a vacuum to a pool pump and drawing water from the pool through a filter basket or the like. Debris is caught in the basket and water flows through the basket and is usually pumped back into the pool.

A problem that often arises with such pool cleaning systems is the back flow from a pump after the pump is turned off. This back flow may take loose debris and feed it back into the pipes that lead back to the swimming pool. This may require a system to be cycled several times to clear the pipes of debris before the pool vacuum process can begin.

Therefore, there is a need for a pool cleaning system that prevents debris from flowing back towards a pool when a pump is turned off.

Furthermore, any such system should be easy to maintain and use.

PRINCIPAL OBJECTS OF THE INVENTION

It is a main object of the present invention to provide a pool cleaning system that prevents debris from flowing back towards a pool when a pump is turned off.

It is another object of the present invention to provide a system that is easy to maintain and use.

SUMMARY OF THE INVENTION

These, and other, objects are achieved by a pool cleaning system that includes a filter system which has a basket interposed in the fluid flow path between the pump and the inlet to the system with the basket having a flap-like cover mounted thereon adjacent to an inlet area of the basket. The cover is biased toward a closed position and is held open by water flowing through the opening in the basket and into the basket. As soon as the water stops flowing, the cover will close over the inlet area.

Using the filter accessory embodying the present invention will close off the filter basket to back flow when the pump is turned off. Any debris in the basket will thus be trapped in the basket and will not flow back into the pipes connected to the pool. Thus, when the debris is cleaned out of the basket and the pump is turned back on, it will not pick up any debris that flowed back into the piping. The pump need not be cycled and the pool cleaning process can quickly begin.

BRIEF DESCRIPTION OF THE DRAWING FIGURES

FIG. 5 is a top plan view of the accessory embodying the present invention.

FIG. 6 is an exploded perspective view of a flap used in the accessory embodying the present invention.

FIG. 7 shows the accessory embodying the present invention with the flap in an open condition.

FIG. 8 shows the accessory embodying the present invention with the flap in a closed condition.

DETAILED DESCRIPTION OF THE PREFERRED EMBODIMENT

Other objects, features and advantages of the invention will become apparent from a consideration of the following detailed description and the accompanying drawings.

Figure 1:
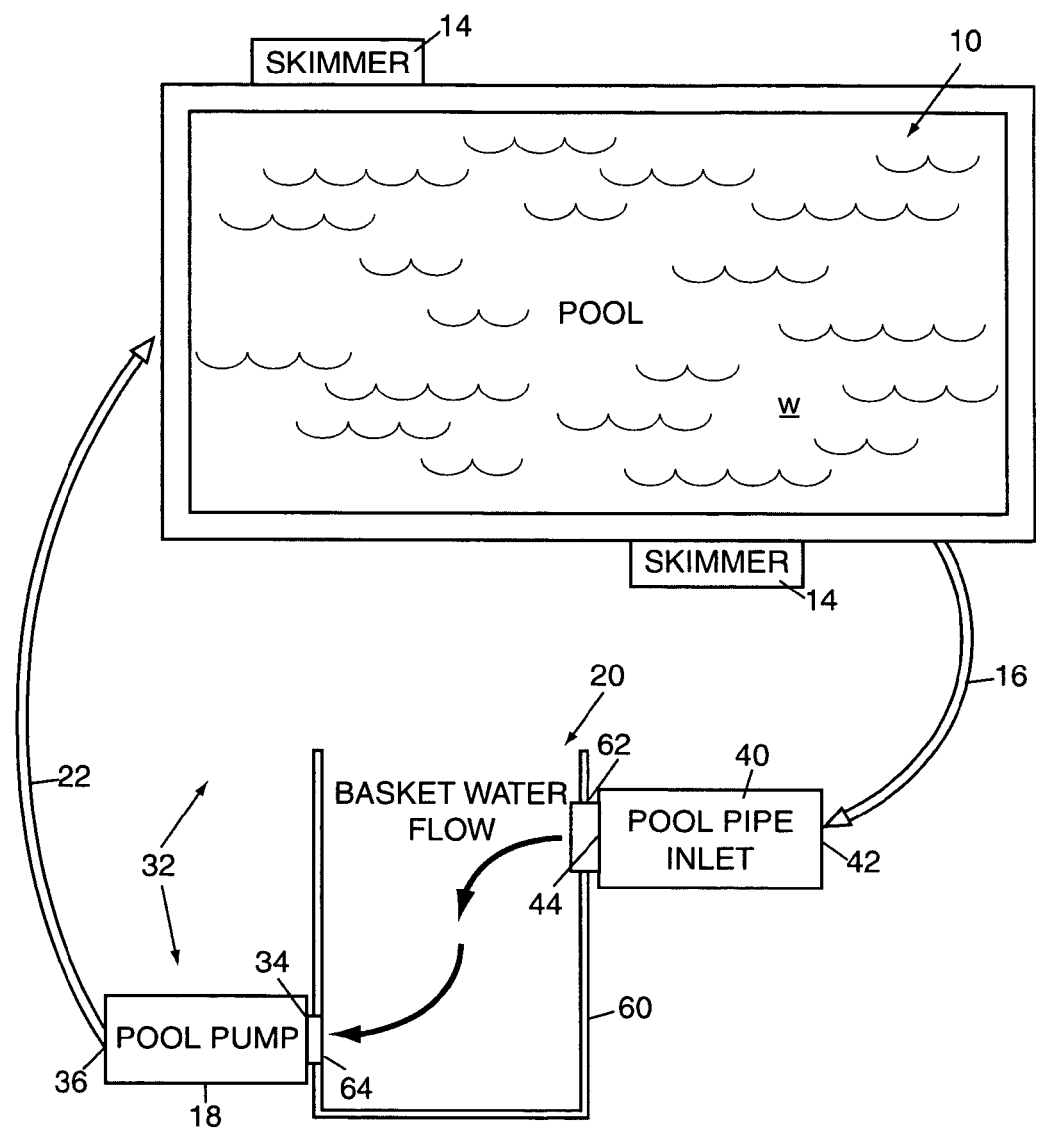
FIG. 1 is a schematic representation of a water flow path of a pool which includes a debris catching accessory embodying the present invention.
Figure 2:
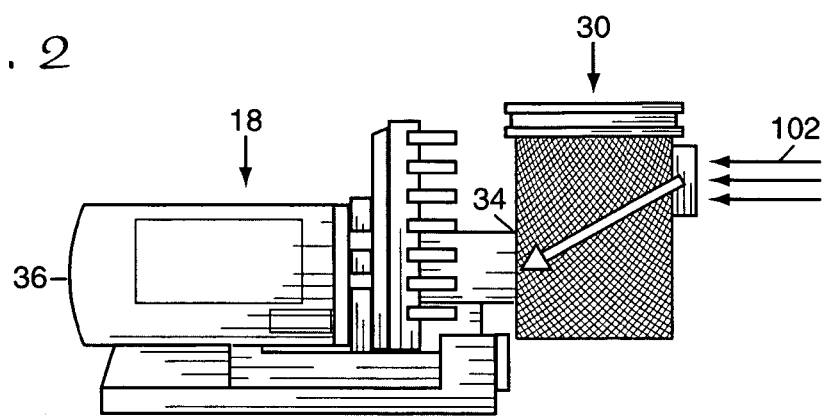
FIG. 2 shows an accessory embodying the present invention in combination with a water pump of a pool.

Referring to FIG. 1, it can be seen that the pool cleaning system of the present invention includes a swimming pool 10 from which water W is removed and replaced during a pool cleaning process. The pool includes a skimming system 14.

Water from the pool flows through a conduit 16 under the influence of a pump 18 and flows through a basket system 20 and then is re-introduced back into the pool via a conduit 22. Debris in the water is trapped in the basket system 20 and clean water is re-introduced back into the pool.

As discussed above, when pump 18 is turned off, a back flow occurs which tends to move debris in the basket system 20 back into the conduit 16. When the pump 18 is turned back on, the debris in conduit 16 must be cleaned out of the system again.

The system embodying the present invention prevents this back flow-induced debris from reaching conduit 16.

Referring to the remaining Figures, it can be understood that the present invention is embodied in a filter accessory 30 for use in a swimming pool water flow system 32 comprising water pump 18 fluidically connected to swimming pool 10. Water pump 18 includes an inlet 34 and an outlet 36. The outlet 36 is fluidically connected to the swimming pool via conduit 22.

A pool pipe inlet section 40 has an inlet 42 fluidically connected to the swimming pool by conduit 16 and an outlet 44.

A filter basket unit 50 is fluidically interposed between pool pipe inlet 40 and inlet 34 of water pump 18. The filter basket unit 50 includes a basket frame 60. Basket frame 60 has an inlet 62, fluidically connected to outlet 44 of pool pipe inlet section 40, and an outlet 64.

A foraminous basket 70 is removably contained in the basket frame 60. Basket 70 traps debris from water flowing therethrough and includes an inlet area 72 located to be fluidically connected to the inlet 62 of the basket frame 60 when the basket 70 is in place in the basket frame 60. Basket 70 further includes an outlet area 74 located to be fluidically connected to outlet 64 of the basket frame 60 when the basket 70 is in place in the basket frame 60.

A flap element 90 is pivotally mounted on the basket 70 adjacent to inlet area 62 of the basket 70. The flap element 90 includes a foraminous body 92, an anchor unit 94 which pivotally mounts the body 92 of the flap element 90 on the basket 70 for movement in directions 96 and 98 as indicated by the double-headed arrow 100 in FIG. 3. Movement in direction 96 is caused by water flowing in direction 102.

Figure 3:
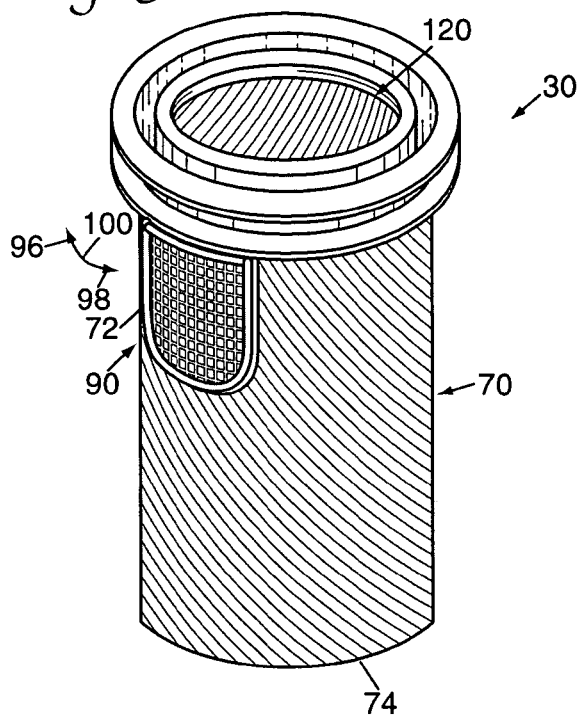
FIG. 3 is a perspective view of a debris catching accessory embodying the present invention.

A biasing unit 110 is included on the anchor unit 94. Biasing unit 110 biases body 92 in direction 98 into a first position covering the inlet area 72 of the basket 70 as shown in FIGS. 3 and 8. The body 92 of the flap element 90 is moved in direction 96 against the bias of the biasing unit 110 away from the inlet area 72 of the basket 70 when water flows through the inlet 62 of the basket frame 60 and through the inlet area of the basket 70 as indicated in FIG. 7.

The anchor elements can be screws 112 fitting through screw-accommodating openings 114 defined through body 92, and the elements of the biasing unit 110 can be springs 116 or 116'.

Figure 4:
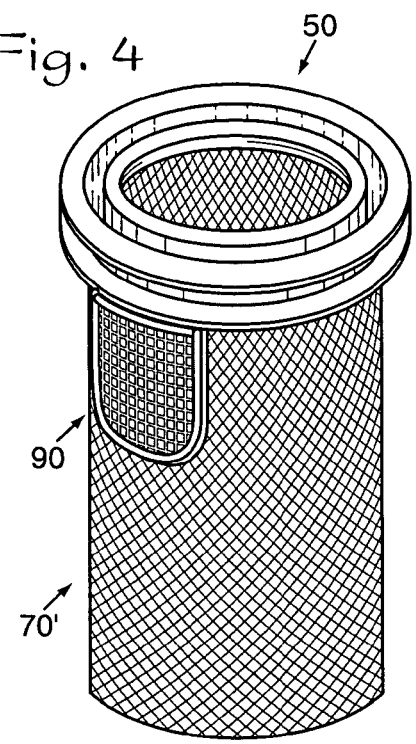
FIG. 4 is a perspective view of an alternative form of the debris catching accessory embodying the present invention.

As indicated in FIGS. 3 and 4, the body 92 of the basket 70 can include openings oriented at forty-five degrees, or the body 92 can include openings that are in a cross hatched pattern as shown for body 70' in FIG. 4.

A cleanout area 120 is defined in the top of the basket 70 so debris can be removed from the basket 70 after the basket 70 has been removed from the basket frame 60 and before the basket 70 is reinserted into the basket frame 60. Since the flap element 90 will close as soon as pump 18 is stopped, debris in the basket 70 will be trapped in the basket 70. In fact, back flow of water out of the basket 70 back into inlet 40 will close the flap element 90 and also prevent debris from moving out of the basket 70 into the inlet 40.

It is understood that while certain forms of the present invention have been illustrated and described herein, it is not to be limited to the specific forms or arrangements of parts described and shown.

What is needed and desired to be covered by Letters Patent is as follows:

1. A filter accessory for use in a swimming pool water flow system comprising:
   a) a water pump fluidically connected to a swimming pool, said water pump including an inlet and an outlet, with the outlet fluidically connected to the swimming pool;
   b) a pool pipe inlet section having an inlet fluidically connected to the swimming pool and an outlet section; and
   c) a filter basket unit fluidically interposed between said pool pipe inlet and the inlet of said water pump, said filter basket unit including
      (1) a basket frame, the basket frame having an inlet fluidically connected to the outlet of said pool pipe inlet section and an outlet,
      (2) a foraminous basket removably contained in the basket frame, the basket including
         (A) an inlet area located to be fluidically connected to the inlet of the basket frame when the basket is in place in the basket frame,
         (B) an outlet area located to be fluidically connected to the outlet of the basket frame when the basket is in place in the basket frame, and
         (C) a flap element pivotally mounted on the basket adjacent to the inlet area of the basket, the flap element including
            (i) a foraminous body,
            (ii) an anchor unit mounting the body of the flap element on the basket, and
            (iii) a biasing unit on the anchor unit, the biasing unit biasing the body into a first position covering the inlet area of the basket, the body of the flap element being moved against the bias of the biasing unit away from the inlet area of the basket when water flows through the inlet of the basket frame and through the inlet area of the basket.

2. The filter accessory as described in claim 1 wherein the biasing unit includes a spring element.

3. The filter accessory as described in claim 1 wherein the foraminous basket includes a forty-five degree pattern.

4. The filter accessory as described in claim 1 wherein the foraminous basket includes a crosshatch pattern.

* * * * *